Patented Oct. 25, 1927.

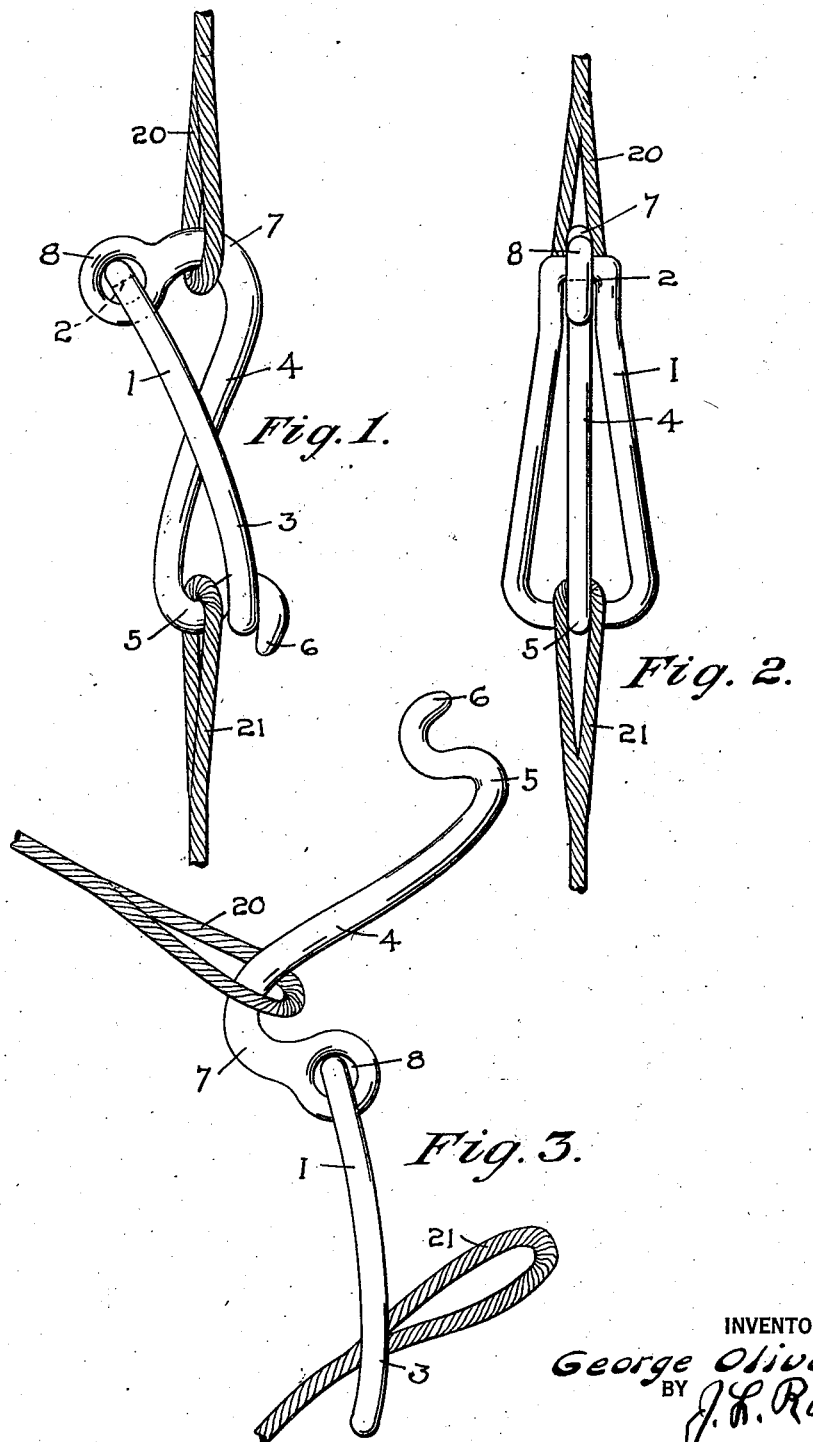

1,646,489

UNITED STATES PATENT OFFICE.

GEORGE OLIVER, OF SEATTLE, WASHINGTON.

CABLE COUPLER.

Application filed January 12, 1926. Serial No. 80,739.

In the logging industry, where a donkey engine is utilized in yarding logs, it is often necessary that extensions be made to the cable to bring it within reach of outlying timber. In making such extensions the common practice, heretofore, has been to provide looped ends for the sections of cable to be united, said looped ends being linked by a tie termed a "Molly Hogan", the same consisting of a short section of a strand of cable disposed between the loops, and then twisted on itself into annular form. This method affords security, but from five to seven minutes are ordinarily required for making such a tie, while the majority of the force remain idle. The strands employed in this manner are usually obtained from old cables ordinarily to be found around logging camps. Additional time, however, is required to cut them for this use, and in detaching them by cutting when the cables are disconnected. Other means are also used, as, for instance, a strap and hook, which device is quite expensive and can be accidently detached, also an S hook, which, while cheap in cost, provides but little security.

The primary object of my invention is to afford a more convenient and economical way whereby such sections of cable may be united, and thus eliminate the disadvantages heretofore outlined. With said object in view, I provide a cable coupler simple in form and effective in operation adapted to be detachably mounted between the looped ends of sections of cable. The device can be instantly applied and as quickly detached, and as it is practically indestructible, it can be utilized repeatedly without any outlay for upkeep.

Other objects will appear as the description of my invention progresses.

In the accompanying drawing—

Figure 1 is a side elevation of the device in closed position, as coupling looped ends of a pair of cables;

Fig. 2, a front elevation of the same; and,

Fig. 3, a side elevation of the coupler in open position, and indicating the manner in which said looped ends are placed relative to the device before coupling them together.

Referring more particularly to the drawing, 1 denotes a yoke, having preferably at its narrow extremity a flattened bight portion 2, and a slightly curved section 3 adjacent its wider extremity. A hooked member, comprising a shank 4 having at one end a hook 5, terminating in a reverse hook 6, and at the other end a hook 7, terminating in an eye 8, is swingingly mounted to said yoke, as indicated, said flattened portion 2 being designed to somewhat limit the lateral movement of the hooked member therein. To subserve the purpose for which the device is primarily intended these parts should be of substantial construction, and obviously they are assembled, as described, before the yoke is welded to form. 20 and 21 designate respectively looped terminals of cables, shown for the purpose of demonstrating the manner in which the device is adapted to link them together.

In employing the device in connection with the looped ends of cables, it is extended as shown in Fig. 3, the loop 20 being slipped over the hooked member and the loop 21 inserted through the yoke in the positions illustrated. The hook 6 is then brought through the loop 21, when a pull on the cable, of which said loop is a part, will cause the coupler and the loops to assume the positions shown in Figs. 1 and 2, and thus securely link the loops together. As is evident, the stronger the pull on the cables, the tighter the contact of the hook 6 with the yoke, and should there be a slack in the cables with a movement of the loop 21 longitudinally of the device, said loop, in pressing against the larger extremity of the yoke or being disposed between the yoke and the shank, would also exert a restraining influence on the hook 6 and prevent it from becoming disengaged from the yoke.

A disconnection of the coupler can not be accomplished until the loop 21 has been again extended through the yoke, and to facilitate the reinsertion of said loop therethrough the yoke is provided with a curved section 3 which, in connection with the hooked member, affords enough space to readily permit the loop to be brought back to its original position relative to the yoke, when tension on the same is released. The hooked member can then be withdrawn from it, and the device and loops allowed to resume the positions shown in Fig. 3, when the loops, as is apparent, can be at once made free.

The device, similarly applied, is also useful in coupling chains together, or in temporarily replacing a broken link, and can be made available under many other conditions where quickly detachable couplings or fastenings are desired.

I claim:

1. A cable coupler, comprising a yoke, having a flattened bight portion, and a hooked member, having a shank provided at one end with a hook terminating in an eye, and at the other end with a reversely curved hook terminating in another hook curved in reverse relation to the second-named hook, said member having a swinging engagement with the portion through said eye and a detachable engagement with the yoke through the third-named hook.

2. A cable coupler, comprising a looped member, having at one extremity a flattened bight portion, and adjacent the other extremity an outwardly curved section, and a hooked member provided at one end with a hook terminating in an eye, the other end terminating in an S hook, said hooked member having a loose connection with said portion through the eye, adapted to provide sufficient play therebetween whereby the S hook may be detachably connected with the other extremity of the member and afford, in cooperation with the looped member, a pair of oppositely disposed elements each adapted to detachably support a closed loop of a cable.

3. A cable coupler comprising an elongated frame, and a hooked member, having a shank provided at one end with a cable supporting-hook terminating in an eye, and at the other end with a reversely curved cable supporting-hook terminating in a fastening-hook curved in reverse relation to the second-named hook, said member having a swinging engagement with one end of the frame through said eye and whereby the fastening hook may detachably engage the other end of the frame, said instrumentalities providing a pair of oppositely disposed cable-supporting hooks each adapted to detachably support a closed loop of a cable.

GEORGE OLIVER.